United States Patent [19]

Simmons

[11] Patent Number: 4,758,011
[45] Date of Patent: Jul. 19, 1988

[54] TRAILER AND ATTACHMENT FOR HORSE TRAINING

[76] Inventor: Phil Simmons, 172 Bay St., S., Apt. 202, Hamilton, Ontario, Canada, L8P 3H7

[21] Appl. No.: 908,164

[22] Filed: Sep. 17, 1986

[51] Int. Cl.⁴ ............................................ A01K 15/02
[52] U.S. Cl. ........................................ 280/63; 119/29; 280/476 R; 280/498
[58] Field of Search ............... 119/29, 15.5 R, 15.5 A; 54/2, 71; 280/416, 292, 63, 204, 289 R, 289 A, 30, 400, 33.99 A, 656, 503, 476, 495, 498, 789, 64, 65, 66, 67, 68, 69

[56] References Cited

U.S. PATENT DOCUMENTS

| | | | |
|---|---|---|---|
| 1,589,016 | 6/1926 | Liedabrand | 280/503 |
| 2,562,596 | 7/1951 | Bonfietti | 280/63 |
| 3,255,733 | 6/1966 | Flynn | 119/15.5 |
| 3,271,048 | 9/1966 | Beesley | 280/63 |
| 4,233,938 | 11/1980 | Ruetenik | 119/15.5 |
| 4,266,508 | 5/1981 | McNulty | 119/29 |
| 4,648,617 | 3/1987 | Hannappel | 280/289 A |

FOREIGN PATENT DOCUMENTS

| | | | |
|---|---|---|---|
| 1106189 | 5/1961 | Fed. Rep. of Germany | 280/63 |
| 782643 | 6/1935 | France | 280/204 |

Primary Examiner—John J. Love
Assistant Examiner—Everett G. Diederiks, Jr.
Attorney, Agent, or Firm—Sim & McBurney

[57] ABSTRACT

A trailer is adapted to be hitched to the back of a horse-drawn jogger, the trailer having a frame and a tongue extending forwardly from the frame with a hitch apparatus for attachment to the jogger. The frame supports two spaced-apart wheels and a grill. The grill extends generally transverse to the forward direction of the trailer and is located generally above and rearwardly of the wheels of the trailer. A self-levelling hitch is connected to the jogger, the hitch being connected to swivel about the axis of the jogger wheels. A bracket extends from the hitch and supports a freely turning levelling wheel which contacts the ground rearwardly of the common axis of the jogger wheels. The hitch has a coupling for engaging the trailer.

7 Claims, 3 Drawing Sheets

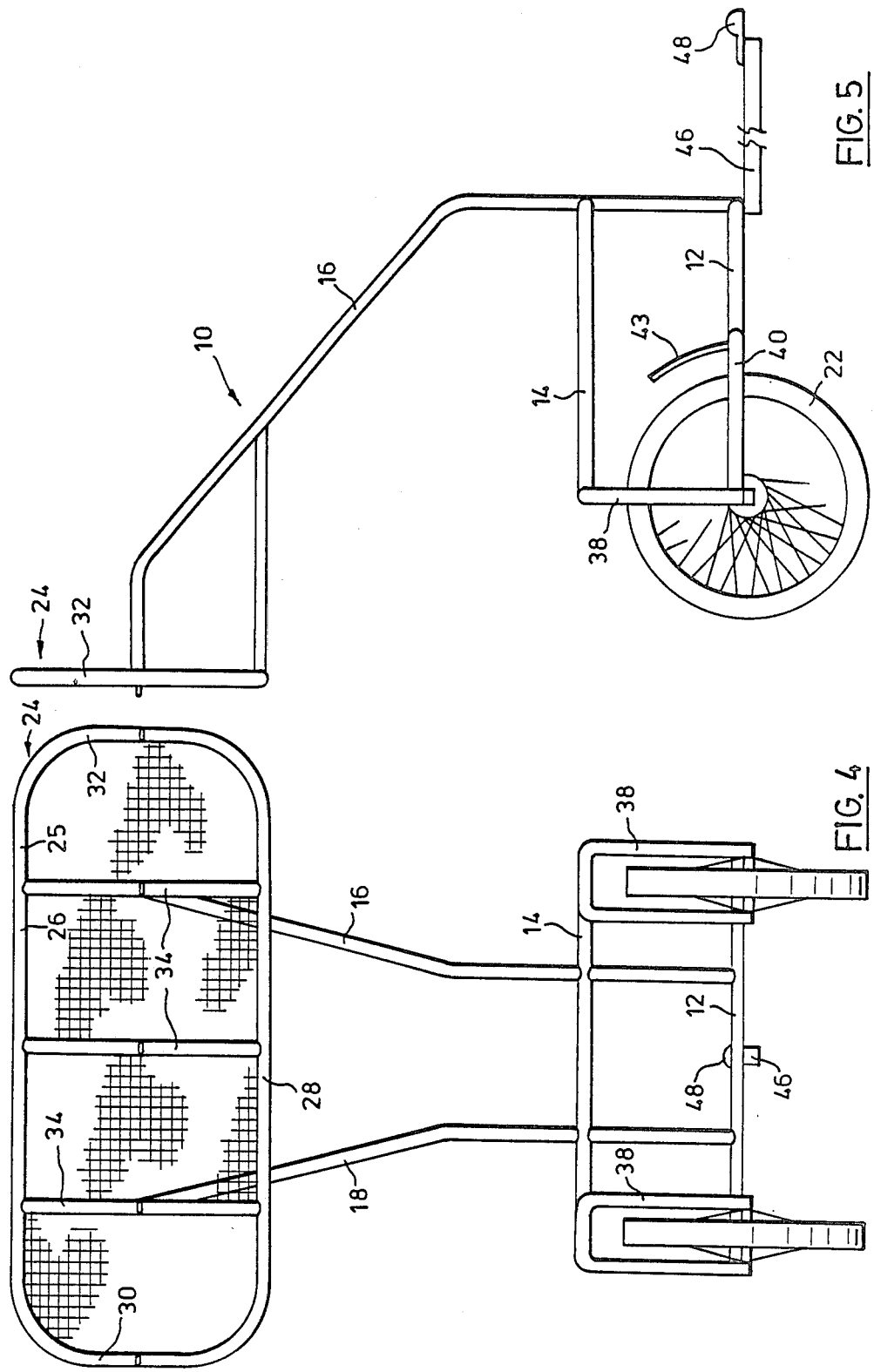

TRAILER AND ATTACHMENT FOR HORSE TRAINING

This invention relates generally to the area of horse racing and training, and has to do particularly with a piece of apparatus intended to improve the training of young horses for "sulky" racing.

BACKGROUND OF THIS INVENTION

The equestrian contests known as "sulky" racing are very popular in North America and elsewhere. These races are often clled jogger racing, harness racing or the trots, although the correct term is "standardbred" racing. The horses utilized are standardbred, rather than thoroughbred.

The sulky itself is a two-wheeled jogger which supports the driver, and the sulky is attached to the harness on the horse by two long shafts. The driver rides behind the horse in sulky racing, rather than on top of the horse as in thoroughbred racing.

One of the problems connected with the training of horses for sulky racing relates to the task of familiarizing the horse with the starting gate. The starting gate is normally supported on a truck or car in the form of elongated transverse arms. In order to start the race, the truck or car moves forward at about 25 miles an hour and when the horses are all lined up behind the gate and moving forwardly, the truck or car accelerates and the starting gate is swung forwardly out of the way to lie alongside the truck or car. The race then begins.

Those familiar with this area known that it is very difficult to train a horse to follow a starting gate closely. All the horse wants to do is race at top speed, but the horse must be controlled at the gate speed until the truck or car starts to accelerate and the race can begin.

GENERAL DESCRIPTION OF THIS INVENTION

In view of the above-described problem, it is an object of an aspect of this invention to provide a device intended to be hitched to the back of the standard jogger used for training, the device simulating a gate and useful for training a young horse to follow a gate. A jogger is similar to a buggy, but is usually somewhat more rugged in construction.

More particularly, this invention provides a horse training device which includes the combination of a horse-drawn jogger with two spaced apart wheels rotatable about a common axis, and a trailer. The trailer includes a frame having a forward end and a rearward end, with a tongue secured to the forward end of the frame and extending forwardly therefrom. Hitch means are provided on the tongue, and the combination further includes means for connecting the hitch means to the jogger between the jogger wheels. Axle means are provided on the frame, with two spaced-apart wheels mounted on the axle means. Finally, there is included a supporting structure secured to the frame and extending upwardly and rearwardly therefrom, the supporting structure supporting a grill, the grill extending transverse to the forward direction of the trailer and being located above and entirely rearward of the spaced-apart trailer wheels.

GENERAL DESCRIPTION OF THE DRAWINGS

One embodiment of this invention is illustrated in the accompanying drawings, in which like numerals denote like parts throughout the several views, and in which:

FIG. 4 is a rear elevational view of the trailer of FIG. 1; and

FIG. 5 is a side elevational view of the trailer of FIG. 1.

DETAILED DESCRIPTION OF THE DRAWINGS

Figure 1:
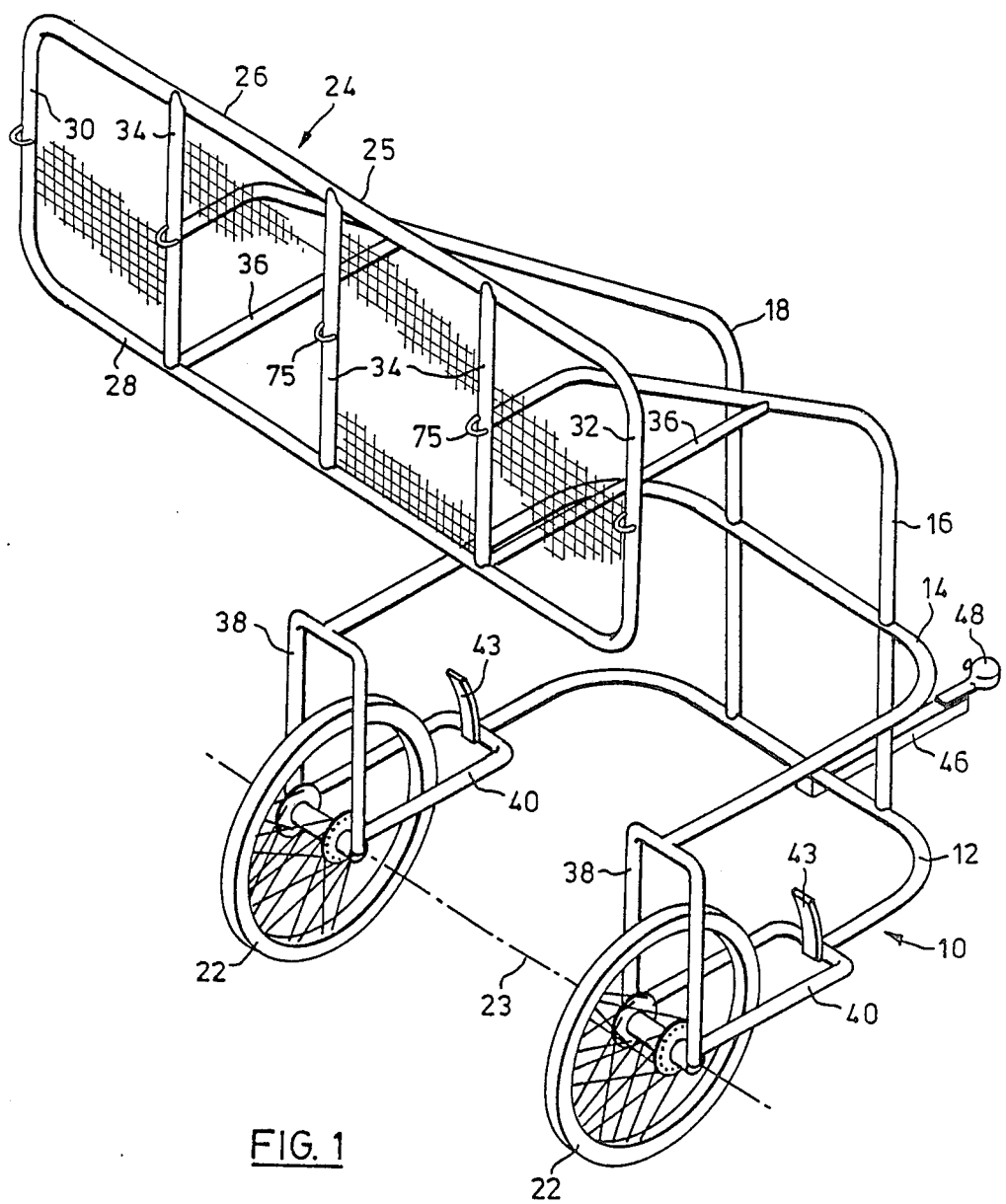
FIG. 1 is a perspective view of a trailer incorporating the present invention.

Attention is first directed to FIG. 1, which shows a trailer 10 incorporating a lower frame member 12 which is generally U-shaped as seen in plan, and an upper frame member 14 which is also generally U-shaped seen in plan. The trailer 10 further includes two angulated members 16 and 18, each having a lower verticl portion welded to the frame members 12 and 14, and a rearwardly and upwardly sloping upper portion. The members 16 and 18 support, at their upper rearward ends, a grill 24 which is located substantially at the head height of a standard adult horse, and which comprises a rectangular frame 25 having a top tubular member 26, a bottom tubular member 28, and two side tubular members 30 and 32. The grill 24 further includes a plurality of laterally spaced tubular members 34 extending vertically between the top and bottom members 26 and 28.

Brace members 36 extend horizontally between the bottom tubular member 28 and the upper/portions of the members 16 and 18, respectively. The purpose of the brace members 36 is to firmly support the grill 24 in its laterally extending position.

Located at the rearward ends of the two arms of the U-shaped member 14 are two smaller U-shaped members 38 oriented vertically. Similarly, connected to the rearward ends of the arms of the other frame member 12 are two horizontally extending U-shaped members 40, which connect with the members 38 in the manner shown. Each pair of members 38 and 40 define a wheel-supporting portion, and two spoked wheels 22 (not shown fully in FIG. 1 in order to illustrate the frame construction more clearly) are connected for free rotation about a common axis 23 drawn as a broken line in FIG. 1.

Upwardly curving members 43 are connected at the bottom of each of the U-shaped members 40, to provide brackets for connecting fenders (not shown).

The trailer 10 is intended to be pulled in the direction of the arrow 45, and for this purpose is equipped with a tongue 46. At its forward or rightward end in FIG. 1, the tongue 46 incorporates a coupling 48 which is adapted to engage a standard trailer hitch ball.

As can be particularly well seen in FIG. 5, the grill 24 is located generally above and somewhat rearwardly of the wheels of the trailer 10.

Figure 2:
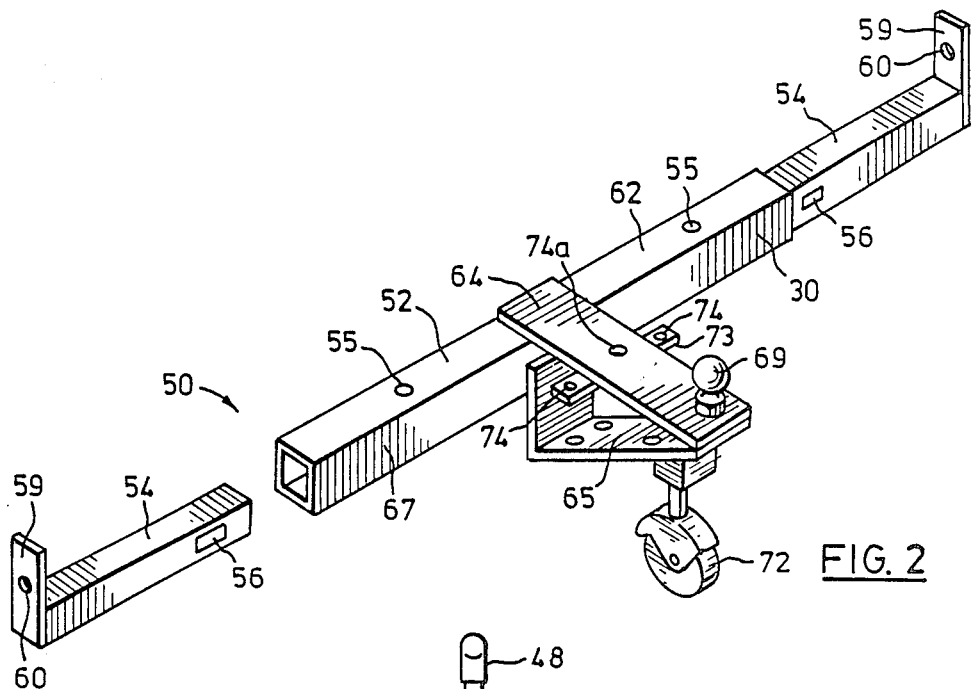
FIG. 2 is a perspective view of a self-levelling hitch for attachment to a horse-drawn jogger so that a trailer can be connected to the hitch.
Figure 3:
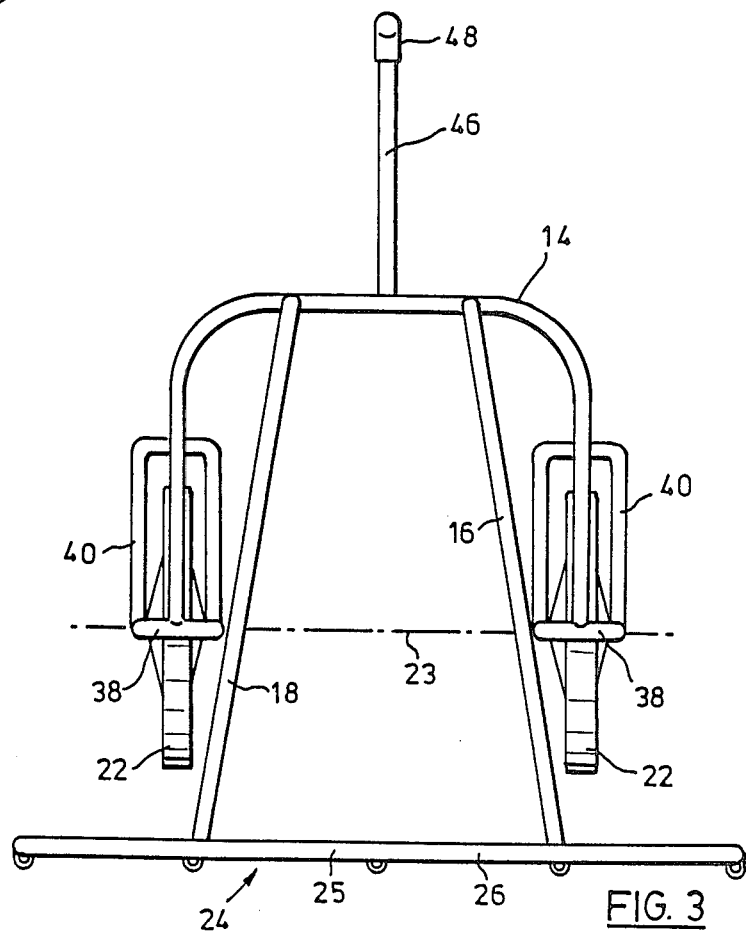
FIG. 3 is a plan view of the trailer of FIG. 1.

Attention is now directed to FIG. 2, which shows in exploded, perspective view a jogger-mounted hitch which is adapted to maintain itself in a stable horizontal orientation regardless of whether the jogger pivots about the common axis of its own wheels. It is important to understand that the hitch shown in FIG. 2 is not mounted to the trailer 10 seen in FIG. 1, but rather to a regular jogger which resembles the standard sulky, and which is pulled behind a horse for training purposes.

In FIG. 2, a jogger mounted hitch is seen generally at 50, and includes support means intended to be mounted to the jogger for swivelling movement about the axis of the jogger wheels. In FIG. 2, the support means comprises a central tubular member 52 of square cross-section, and two telescoping members 54, one at either end. Each of the telescoping members 54 has a spot welded spacer 56 on it, to allow the members 54 to be snugly but slidably received within the central tubular member 52. It will be understood that the spacers 56 could be omitted by sizing the telescoping members 54 to closely match the inside cross-section of the tubular member 52. The top wall of the central tubular member 52 is provided with bore holes 55 which may be threaded to receive a threaded bolt-like fasteners, or alternatively may have nuts welded thereto to receive such fasteners. The fasteners (not shown) would function in the nature of set-screws, to firmly clamp the telescoping members 54 in desired axial positions with respect to the central tubular member 52. The telescoping nature of the hitch is provided in order to allow the hitch to be accommodated to joggers of different sizes. At the distal end of each of the telescoping members 54 is an upstanding plate 59, and each plate 59 has a transverse aperture 60 containing a sealed bearing (not shown) for connection to the central shaft of the respective wheel mount of the jogger. It will thus be understood that the support means constituted by the tubular member 52 and the telescoping members 54 is pivotally mounted to the jogger about the axis of the jogger wheels, even though the members 52 and 54 do not lie directly on that axis.

Firmly connected by welding or equivalent means to the top surface 62 of the tubular member 52 is a horizontal brace 64 which extends rearwardly with respect to the motion of the jogger. An L-shaped bracket 65 is welded to the rear side wall 67 of the tubular member 52 directly beneath the member 64, and is welded or otherwise adhered to the rearward end of the brace 64, to form a rigid and stable support for a hitch ball 69 of convention construction.

Mounted generally beneath the ball 69 toward the rear of the bracket 65 is a castering wheel 72 of conventional construction. The wheel 72 is intended to ride on the ground at a location rearwardly of the axis of the wheels of the jogger, and this contact will ensure that the support means constituted by the tubular member 52 and the telescoping members 54 will always remain in the same substantially horizontal position, regardless of whether the jogger is caused to swivel about the axis of its own wheels, due to rearing of the horse. This in turn will ensure that the hitch ball 69 remains in a constant orientation, projecting upwardly, so that the trailer 10, which is connected to the hitch ball 69, does not become dislodged.

It will be appreciated by those skilled in the art that the wheel 72 does not need to be a castering wheel, but can be a fixed wheel, due to the short distance that it lies behind the axis of the jogger wheels.

A transverse bracket 73 with aperatures 74 is fastened to the brace 64 by a bolt 74a, to allow the trailer to be secured by safety chains to the jogger.

As best seen in FIG. 1, the grill 24 is provided with a plurality of fixed loops 75 of wire or bar stock, to which a horse or horses can easily be tethered.

It will thus be appreciated that the arrangement described hereinabove provides a novel trailer for training young horses to follow a gate, and a reliable hitching means by which the trailer can be hitched behind a jogger.

In use, the trailer shown in FIG. 1 is hitched behind a jogger which in turn is pulled by a horse in training. Another horse pulling a similar jogger for training purposes is made to run closely behind the grill 24. This gets the second horse used to the idea of following a gate in a controlled manner.

Another use of the trailer described herein is to allow a horse to have a workout without being harnessed up. Trainers generally find that, as soon as a horse is fitted with his harness, the horse thinks that it must now race at top speed and becomes very keyed up. This tendency varies from horse to horse, but some are very high-strung, and are very difficult to work at anything but maximum speed. By tethering a horse or horses, without a harness and without pulling a sulky or jogger, to one of the loops 75 of the grill 24, the horse can be led around the track at a comfortable pace and in a controlled manner.

While one embodiment of this invention has been illustrated in the accompanying drawings, and described hereinabove, it will be apparent to those skilled in the art that changes and modifications may be made therein without departing from the essence of this invention, as set forth in the appended claims.

The embodiments of the invention in which an exclusive property or privilege is claimed are defined as follows:

I claim:

1. A horse training device having in combination a horse-drawn jogger with two spaced apart wheels rotatable about a common axis and a trailer, said trailer comprising:
  a frame having a forward end and a rearward end;
  a tongue secured to the forward end of the frame and extending forwardly therefrom;
  hitch means on the tongue;
  means for connecting the hitch means to the jogger between the jogger wheels;
  axle means on the frame;
  two spaced-apart wheels mounted on the axle means; and
  a supporting structure secured to the frame and extending upwardly and rearwardly therefrom, said supporting structure supporting a grill, the grill extending transverse to the forward direction of the trailer and being located above and entirely rearward of the spaced-apart trailer wheels.

2. The invention claimed in claim 1, in which the grill is located substantially at the height of the head of a horse to be trained.

3. The invention claimed in claim 1, in which the grill comprises a rectangular frame having top and bottom tubular members and two side tubular members, and a plurality of laterally spaced tubular members extending vertically between said top and bottom members.

4. The invention claimed in claim 1, in which said means for connecting includes a jogger-mounted hitch device adapted to maintain itself in a constant orientation regardless of whether the jogger pivots about the common axis of its own wheels, the hitch device including support means mounted to the jogger for swivelling movement about the axis of the jogger wheels, bracket means fixed to the support means, and a freely rotatable levelling wheel mounted to the bracket means and adapted to contact the ground rearwardly of the common axis of the jogger wheels.

5. The invention claimed in claim 4, in which the hitch device further includes an upstanding hitch ball, the hitch means on said tongue including a coupling adapted to engage said hitch ball.

6. The invention claimed in claim 5, in which the levelling wheel and the hitch ball are both located substantially midway between the jogger wheels, both being supported on said bracket means.

7. The invention claimed in claim 4, in which the support means comprises a transverse bar extending between the jogger wheels.

* * * * *